(12) United States Patent
Ganapathiappan et al.

(10) Patent No.: US 8,927,096 B2
(45) Date of Patent: Jan. 6, 2015

(54) COATED SUBSTRATES FOR LIQUID ELECTROPHOTOGRAPHIC PRINTING

(75) Inventors: Sivapackia Ganapathiappan, Palo Alto, CA (US); Hou T. Ng, Palo Alto, CA (US); Eric Hoarau, Palo Alto, CA (US); Albert Teishev, Nes Ziona (IL); Sergio Brandriss, Nes Ziona (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 185 days.

(21) Appl. No.: 13/455,613

(22) Filed: Apr. 25, 2012

(65) Prior Publication Data

US 2013/0288017 A1    Oct. 31, 2013

(51) Int. Cl.
*B32B 7/02*    (2006.01)
*B32B 27/40*    (2006.01)
*B32B 27/36*    (2006.01)
*C08J 5/18*    (2006.01)
*B32B 27/08*    (2006.01)

(52) U.S. Cl.
CPC . *B32B 7/02* (2013.01); *B32B 27/40* (2013.01); *B32B 27/36* (2013.01); *C08J 5/18* (2013.01); *B32B 27/08* (2013.01)
USPC .......... 428/212; 428/213; 428/216; 428/220; 428/423.1; 428/480

(58) Field of Classification Search
CPC .......... B32B 7/02; B32B 27/08; B32B 27/36; B32B 27/40; C08J 5/18
USPC ............... 428/212, 213, 216, 220, 423.1, 480
See application file for complete search history.

(56) References Cited

U.S. PATENT DOCUMENTS

| 3,158,494 | A | 11/1964 | Eikvar et al. |
| 4,868,581 | A | 9/1989 | Mouri et al. |
| 6,423,173 | B1* | 7/2002 | Wexler ......................... 156/277 |
| 7,022,385 | B1 | 4/2006 | Nasser |
| 2003/0224150 | A1* | 12/2003 | Ludwig et al. ............. 428/195.1 |
| 2011/0027543 | A1 | 2/2011 | Metla |

* cited by examiner

*Primary Examiner* — Betelhem Shewareged
(74) *Attorney, Agent, or Firm* — Thorpe North & Western, LLP; Gary P. Oakeson

(57) ABSTRACT

The present disclosure is drawn to compositions and methods involving coated substrates for liquid electrophotographic printing. Generally, a coated substrate for liquid electrophotographic printing can comprise a polyethylene- or polypropylene-based substrate and a coating adhered to the substrate, the coating comprising a water-based aliphatic polyurethane polymer.

18 Claims, 1 Drawing Sheet

COATED SUBSTRATES FOR LIQUID ELECTROPHOTOGRAPHIC PRINTING

BACKGROUND

In many printing systems, it is common practice to develop a hardcopy of an image by using a photoconductive surface. The photoconductive surface is selectively charged with a latent electrostatic image having image and background areas. For example, a liquid developer comprising charged toner particles in a carrier liquid can be brought into contact with the selectively charged photoconductive surface. The charged toner particles adhere to the image areas of the latent image while the background areas remain clean. A hardcopy material (e.g. paper or other print substrate) is brought directly or indirectly into contact with the photo-conductive surface in order to transfer the latent image. Various substrates and toners can be used providing various degrees of printing performance.

BRIEF DESCRIPTION OF THE DRAWINGS

Additional features and advantages of the disclosure will be apparent from the detailed description which follows, taken in conjunction with the accompanying drawings, which together illustrate, by way of example, features of the invention.

Figure 1:
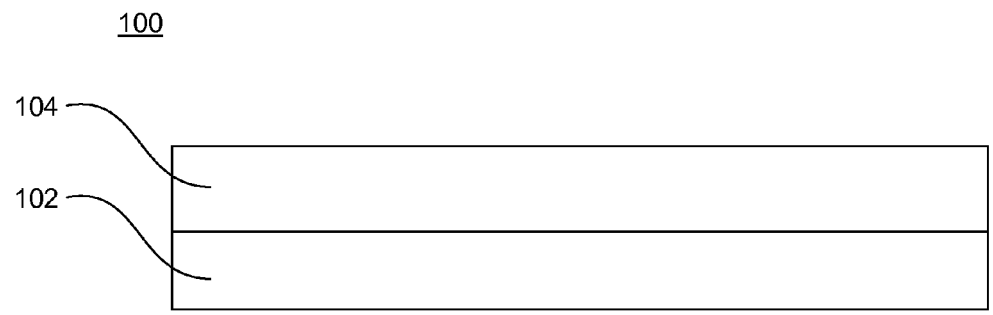
FIG. 1 is a cross-section perspective of a coated substrate in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It has been recognized that it would be advantageous to develop a coating that can be applied to a substrate, thereby increasing the adhesiveness between the coated substrate and an ink, such as an LEP ink, and that can reduce delamination issues of coated substrates. In accordance with this, the present disclosure is drawn to coated substrates that can be printed effectively with an LEP ink, as well as associated methods. Notably, the present coated substrates can be printed with LEP inks without delamination issues that are typical in printing on polymer substrates with LEP inks. Additionally, the present coated substrates provide excellent printing performance using common LEP inks without the need of modifying such LEP inks with costly additives.

It is noted that when discussing the present coated substrates or methods of increasing LEP ink adhesiveness of a polyethylene- or polypropylene-based substrate, each of these discussions can be considered applicable to each of these embodiments, whether or not they are explicitly discussed in the context of that embodiment. Thus, for example, in discussing a polyurethane polymer in a coated substrate, such a polyurethane polymer can also be used in a method of increasing LEP ink adhesiveness of a polyethylene- or polypropylene-based substrate, and vice versa.

Thus, a coated substrate for liquid electrophotographic printing can comprise a polyethylene- or polypropylene-based substrate and a coating adhered to the substrate, where the coating comprises a water-based aliphatic polyurethane polymer.

The present coatings described herein can generally be applied to polyethylene-based substrates and polypropylene-based substrates. In one example, the polyethylene-based substrate can be a polyethylene terephthalate substrate. In another example, the substrate can be a polypropylene substrate. Other polyethylene- or polypropylene-based substrates can also be used, as would be appreciated by one skilled in the art after considering the present disclosure. The present coatings can provide reduced delamination of the polyethylene-based and polypropylene-based substrates.

As discussed herein, the coatings generally include a water-based aliphatic polyurethane polymer. There are several properties of the coating that are worth noting. In one example, the polyurethane polymer can have a tensile strength from 2000 to 5000 psi. More specifically, the tensile strength can be from 2500 to 4500 psi. In another aspect, the tensile strength can be from 2700 to 4200 psi.

Further, the polyurethane polymer can have an elongation capacity from 500% to 800%. In one aspect, the elongation capacity can be from 550% to 750%. In another aspect, the elongation capacity can be from 560% to 720%.

The modulus of the coating can also have certain properties as described herein. For example, the polyurethane polymer can have a 100% modulus from 300 to 1500 psi. As used herein, "modulus" refers to the force (stress) in pounds per square inch (psi) required to produce a specific percentage of elongation (strain) of a polymer. For example, "100% modulus" refers to the force in pounds per square inch required to produce 100% elongation of a polymer. In one aspect, the 100% modulus can be from 400 to 1200 psi. In another aspect, the 100% modulus can be from 450 to 950 psi.

Regarding the glass transition temperature, the polyurethane polymer can have a $T_g$ in the range from −50° C. to 100° C. In one aspect, the $T_g$ can be from −50° C. to 30° C.

In certain specific examples, the coatings described herein can further comprise a particulate additive, such as an inorganic or organic pigment or other particle. The additive can be selected from the group of silica, alumina, zinc oxides, organic particulates including polymer particulates such as polystyrene, combinations thereof, and mixtures thereof.

Conventional coating techniques can be used to apply the coatings to the substrate. For example, roller, blade, wire bar, dip, solution-extrusion, air-knife, and gravure coating techniques can be used. In one aspect, the coatings can be applied by a wire bar. Generally, the coatings can have a thickness of 0.1 micron to 15 microns. In one aspect, the coating can have a thickness of 2 microns to 5 microns.

Typically, the total weight of the coatings can be in the range of 10 to 100 grams per square meter (gsm) and, in one aspect, can be 15 to 60 gsm. Additionally, the coatings can be dried in a conventional oven, laser cured, radiation cured, or a combination thereof.

In addition to the above, a method of increasing liquid electrophotographic (LEP) ink adhesiveness to a polyethylene- or polypropylene-based substrate can comprise applying a water-based aliphatic polyurethane polymer coating to the polyethylene- or polypropylene-based substrate. In other words, by applying the water-based aliphatic polyurethane polymer on the polyethylene- or polypropylene-based substrate, the adhesiveness of a liquid electrophotographic (LEP) ink to the substrate is enhanced, even when the water-based aliphatic polyurethane polymer is applied as a thin layer. In one example, the step of applying can be performed by wire coating, though the other coating procedures can also be effective for use.

The liquid electrophotographic inks or liquid toners described herein can be any such ink or toners known in the art. Generally, liquid electrophotographic inks can comprise a liquid vehicle, a colorant, a charging component, and, optionally, polymer(s). Additionally, other additive may be present in the liquid toner. One or more non-ionic, cationic, and/or anionic surfactant can be present, ranging from 0.01 wt % to 5 wt %, though it is not required that the surfactant be present. The balance of the formulation can be other liquid vehicle components known in the art, such as biocides, organic solvents, viscosity modifiers, and materials for pH adjustment, sequestering agents, preservatives, compatibility additives, emulsifiers, and the like.

In addition to the above, a photobook can comprise a coated substrate including an image printed thereon using liquid electrophotography. The coated substrate can include any of those as described herein. In one example, the coated substrate forms part of a cover of the photobook.

Turning now to FIG. 1, a coated substrate 100 can include a substrate 102 having a coating 104 applied thereto. As discussed herein, the substrate can be a polyethylene- or polypropylene-based substrate and the coating can comprise a water-based aliphatic polyurethane polymer.

Figure 2:
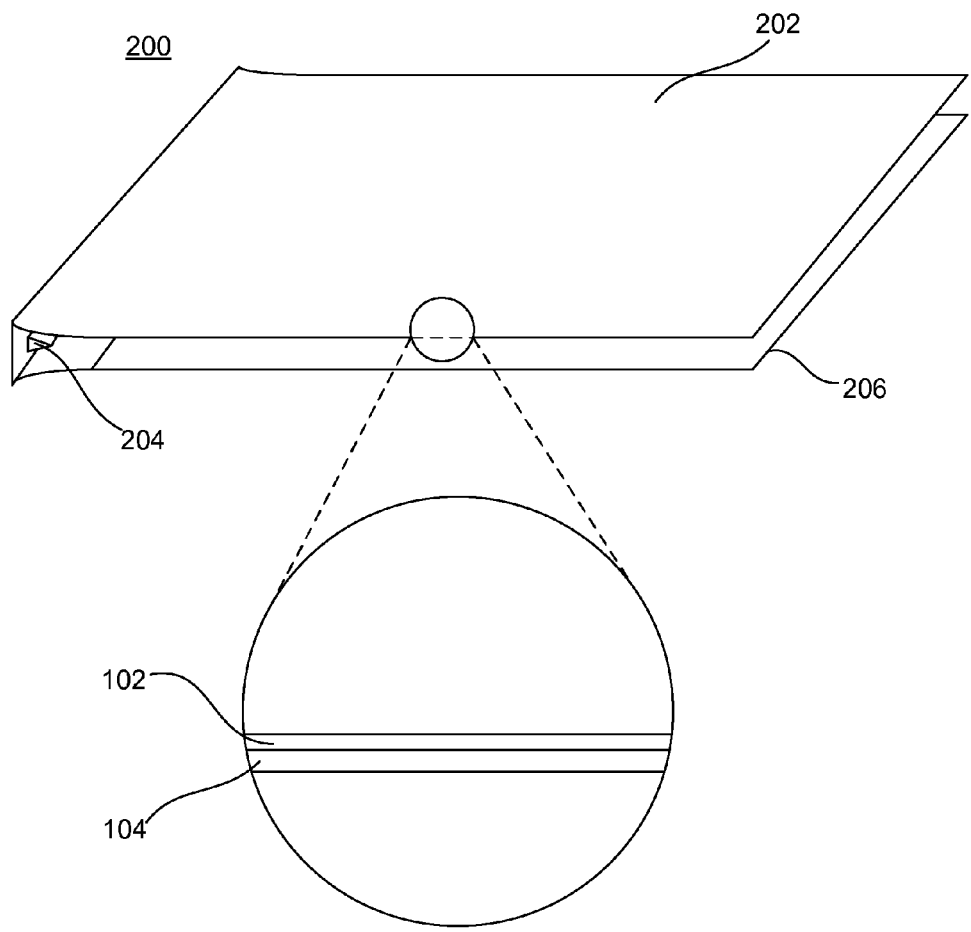
FIG. 2 is a drawing of a photobook in accordance with another example of the present disclosure.

Turning now to FIG. 2, a photobook 200 can comprise a front cover 202, a binder 204, and a back cover 206. The cover can comprise the coated substrate comprising a substrate 102 and coating 104. The photobook can further include pages having media and/or photographs as desired (not shown).

It is noted that, as used in this specification and the appended claims, the singular forms "a," "an," and "the" include plural referents unless the context clearly dictates otherwise. For example, reference to "an ink," "a coating," or "the additive" includes singular (ink, coating, additive, etc.) or plural (inks, coatings, additives) usage of the same, if the context permits.

As used herein, "liquid vehicle," "vehicle," or "liquid medium" refers to the fluid in which the colorant of the present disclosure can be dispersed to form a liquid electrophotographic ink. Such liquid vehicles and vehicle components are known in the art. Typical liquid vehicles can include but are not limited to a mixture of a variety of different agents, such as surfactants, co-solvents, buffers, biocides, sequestering agents, compatibility agents, antifoaming agents, oils, emulsifiers, viscosity modifiers, etc.

As used herein, "liquid electrophotographic ink," "LEP ink," or "liquid toner" generally refers to an ink having a liquid vehicle, a colorant, a charging component, and polymer(s) that is used for electrophotographic printing.

As used herein, "liquid electrophotographic printing" generally refers to the process that provides a liquid electrophotographic ink or ink toner image that is electrostatically transferred from a photo imaging plate to an intermediate drum or roller, and then thermally transferred to a substrate, or to the process wherein the ink image is electrostatically transferred from the photo imaging plate directly onto a substrate. Additionally, "liquid electrophotographic printers" generally refer to those printers capable of performing electrophotographic printing, as described above. These types of printers are different than traditional electrophotographic printers that utilized essentially dry charged particles to image a media substrate.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following examples illustrate embodiments of the disclosure that are presently known. Thus, these examples should not be considered as limitations of the invention, but are merely in place to teach how to make compositions of the present disclosure. As such, a representative number of compositions and their method of manufacture are disclosed herein.

Example 1

Water-Based Aliphatic Polyurethane Coating on Polyethylene Terephthalate (PET) Substrate Two water-based aliphatic polyurethanes, PU1 (Sancure® 2026 from Lubrizol Advanced Materials Inc.) and PU2 (Sancure® 2310 from Lubrizol Advanced Materials Inc.) were prepared in 10 wt % and 40 wt % solutions. The properties for the polyurethanes are listed in Table 1. Each solution was coated onto a polyethylene terephthalate (PET) substrate with various thicknesses from differing wire bar sizes as shown in Table 2. Water was removed at ambient temperature to form a uniform coating.

TABLE 1

| Polyurethane | Tensile Strength (psi) | Elongation (%) | 100% Modulus (psi) |
| --- | --- | --- | --- |
| Sancure ® 2026 | 4200 | 560 | 950 |
| Sancure ® 2310 | 2700 | 720 | 460 |

TABLE 2

| Coated Substrate | Polyurethane | Wire Bar | Approximate Coating Thickness (μm) |
|---|---|---|---|
| #1 | 10 wt % PU1 | #8 | 2 |
| #2 | 40 wt % PU1 | #3 | 2 |
| #3 | 40 wt % PU1 | #8 | 8 |
| #4 | 10 wt % PU2 | #3 | 1.5 |
| #5 | 10 wt % PU2 | #8 | 2 |
| #6 | 40 wt % PU2 | #8 | 8 |
| #7 | 40 wt % PU2 | #50 | 20 |

Example 2

LEP Adhesion on the Coated Substrates of Example 1

Coated substrates #1-7 from Example 1 were printed on with standard LEP inks (HP ElectroInk cyan, yellow, magenta and black from 3000, 4000 and 5000 series) with an HP Indigo Series III press. Additionally, a non-coated substrate was printed for comparison. After printing, the printed image was subjected to a standard peel test by applying pressure with masking tape (#230 from 3M Corp.). The tape was removed and the area was evaluated for the loss of ink. Notably, the coated substrates provided significant increased adhesion compared to the non-coated substrate. Specifically, coated substrates #3-6 provided at least 90% more ink retention than that of the non-coated substrate. Additionally, coated substrate #1-2 and 7 provided at least 25% more ink retention than that of the non-coated substrate.

Example 3

Water-Based Aliphatic Polyurethane Coating on Polypropylene Substrate

Two water-based aliphatic polyurethanes, PU1 (Sancure® 2026 from Lubrizol Advanced Materials Inc.) and PU2 (Sancure® 2310 from Lubrizol Advanced Materials Inc.) were prepared in 10 wt % and 40 wt % solutions. Each solution was coated onto a polypropylene (PP) substrate with various thicknesses from differing wire bar sizes as shown in Table 3. Water was removed at ambient temperature to form a uniform coating.

TABLE 3

| Coated Substrate | Polyurethane | Wire Bar | Approximate Coating Thickness (μm) |
|---|---|---|---|
| #8 | 10 wt % PU1 | #30 | 4 |
| #9 | 40 wt % PU2 | #50 | 20 |

Example 4

LEP Adhesion on the Coated Substrates of Example 3

Coated substrates #8-9 from Example 3 were printed on with standard LEP inks (HP ElectroInk cyan, yellow, magenta and black from 3000, 4000 and 5000 series) using an HP Indigo Series III press. Additionally, a non-coated substrate was printed for comparison. After printing, the printed image was subjected to a standard peel test by applying pressure with masking tape (#230 from 3M Corp.). The tape was removed and the area was evaluated for the loss of ink. Notably, the coated substrates provided significant increased adhesion compared to the non-coated substrate. Specifically, coated substrates #8-9 provided at least 25% more ink retention than that of the non-coated substrate.

Example 5

Water-Based Aromatic Polyurethane Coating on Polyethylene Terephthalate (PET) Substrate As a comparative, a water-based aromatic polyurethane, PU3 (Sancure® 12954 from Lubrizol Advanced Materials Inc.) was prepared in a 32 wt % solution. The solution was coated onto a polyethylene terephthalate (PET) substrate with a #50 wire coating in a thickness of approximately 18 μm. Water was removed at ambient temperature to form a uniform coating. The properties for the polyurethane are listed in Table 4.

TABLE 4

| Polyurethane | Tensile Strength (psi) | Elongation (%) | 100% Modulus (psi) |
|---|---|---|---|
| Sancure ® 12954 | 3800 | 120 | 3600 |

Example 6

LEP Adhesion on the Coated Substrate of Example 5

For comparison purposes, the coated substrate from Example 5 was printed on with standard LEP inks (HP ElectroInk cyan, yellow, magenta and black from 3000, 4000 and 5000 series) using an HP Indigo Series III press. After printing, the printed image was subjected to a standard peel test by applying pressure with masking tape (#230 from 3M Corp.). The tape was removed and the area was evaluated for the loss of ink. Notably, the coated substrate of Example 5 provided no improvement of ink adhesion as compared to a non-coated substrate.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A coated substrate for liquid electrophotographic printing, comprising:
   a polyethylene- or polypropylene-based substrate; and
   a coating directly adhered to the substrate, the coating comprising a water-based aliphatic polyurethane polymer, wherein the polyurethane polymer has a 100% modulus at 300 to 1500 psi.

2. The coated substrate of claim 1, wherein the polyethylene-based substrate is a polyethylene terephthalate substrate.

3. The coated substrate of claim 1, wherein the polyurethane polymer has a tensile strength of 2000 to 5000 psi.

4. The coated substrate of claim 1, wherein the polyurethane polymer has an elongation capacity of 500% to 800%.

5. The coated substrate of claim 1, wherein the coating has a thickness of 0.1 micron to 15 microns.

6. The coated substrate of claim 1, wherein the polyurethane polymer has a $T_g$ in the range from −50° C. to 100° C.

7. The coated substrate of claim 1, wherein the substrate is polyethylene terephthalate and the coating has a thickness of 2 microns to 5 microns.

8. The coated substrate of claim 1, wherein the coating further comprises an additive selected from the group of silica, alumina, zinc oxides, organic particulates, polymer particulates, combinations thereof, and mixtures thereof.

9. A method of increasing liquid electrophotographic ink adhesiveness of a polyethylene- or polypropylene-based substrate, comprising applying a water-based aliphatic polyurethane polymer coating directly to the polyethylene- or polypropylene-based substrate wherein the polyurethane polymer has a 100% modulus at 300 to 1500 psi.

10. The method of claim 9, wherein the step of applying is performed by wire coating.

11. The method of claim 9, further comprising drying the coating.

12. The method of claim 9, wherein the step of applying provides a coating thickness of 0.1 micron to 15 microns.

13. The method of claim 9, wherein the water-based aliphatic polyurethane polymer has a tensile strength of 2000 to 5000 psi, has an elongation of 500% to 800%, and has a $T_g$ in the range from −50° C. to 100° C.

14. The method of claim 9, wherein the substrate is polyethylene terephthalate and the step of applying provides a coating thickness of 2 micron to 5 microns.

15. A photobook, comprising:
a coated substrate including an image printed thereon using liquid electrophotography,
the coated substrate including:
a polyethylene- or polypropylene-based substrate; and
a coating directly adhered to the substrate, the coating comprising a water-based aliphatic polyurethane polymer wherein the polyurethane polymer has a 100% modulus at 300 to 1500 psi.

16. The photobook of claim 15, wherein the polyethylene-based substrate is a polyethylene terephthalate substrate.

17. The photobook of claim 15, wherein the polyurethane polymer has a tensile strength of 2000 to 5000 psi, and an elongation capacity of 500% to 800%.

18. The photobook of claim 15, wherein the coated substrate forms part of a cover of the photobook.

* * * * *